Dec. 15, 1970    J. MAKO    3,548,274

STEPPING MOTOR SPEED CONTROL

Filed Oct. 24, 1968    2 Sheets-Sheet 1

INVENTOR
JOHN MAKO

BY *Francis V. Giolma*
ATTORNEY

United States Patent Office 3,548,274
Patented Dec. 15, 1970

3,548,274
STEPPING MOTOR SPEED CONTROL
John Mako, Vestal, N.Y., assignor to International Business Machines Corporation, Armonk, N.Y., a corporation of New York
Filed Oct. 24, 1968, Ser. No. 770,376
Int. Cl. H02k 29/02
U.S. Cl. 318—138                        8 Claims

ABSTRACT OF THE DISCLOSURE

Speed control of a stepping motor is obtained by varying the effective value of a commutating capacitor connected between the phase windings of the motor, through selective switching of the capacitor.

CROSS-REFERENCE TO RELATED APPLICATIONS

This invention is related to and is an improvement on the invention of co-pending application Ser. No. 537,913 (Docket 6702) filed on Mar. 28, 1966 by Eugene T. Kozol and Joseph P. Pawletko, entitled "Drive Circuit for Carriage Stepping Motor."

FIELD OF INVENTION

This invention relates generally to stepping motor control systems, and it has reference in particular to control systems for varying the maximum self-stepping rate of a stepping motor.

DESCRIPTION OF PRIOR ART

Heretofore, speed control of stepping motors has been effected primarily by changing the frequency of the drive pulses, varying the physical location of an emitter read head, or by selectively connecting the motor drive circuit to different read heads which have different time phase relations relative to each other.

SUMMARY OF INVENTION

Generally stated, it is an object of this invention to provide an improved speed control system for a stepping motor.

More specifically, it is an object of this invention to provide for changing the speed of a stepping motor by varying the effective value of a capacitor connected across a pair of oppositely related motor phase windings.

Another object of the invention is to provide for selectively switching a capacitor connected across a pair of stepping motor phase windings so as to vary its effective value.

Yet another object of the invention is to provide for changing the switching time of a capacitor connected across a pair of phase windings of a stepping motor so as to change the effective value thereof.

It is also an object of this invention to provide time-controlled switching of a commutating capacitor to connect it across opposite phase windings of a stepping motor to vary the speed of the motor.

Yet another object of this invention is to provide for using a silicon controlled rectifier with a delay circuit for controlling the effectvie value of a commutating capacitor connected across the phase windings of a stepping motor.

Another important object of this invention is to provide for using an adjustable single shot with an inverter for delaying the switching of a commutating capacitor to connect it across opposed phase windings of a stepping motor so as to vary the speed thereof.

In practicing the invention in accordance with one of its embodiments, commutating capacitors are connected across each of two pairs of opposed phase windings in a stepping motor, which are arranged to be selectively energized by pulses from a suitable source of electrical energy. The connection is effected by bi-directional silicon controlled rectifiers whose operation is controlled in timed relation with the energization of the windings through adjustable delay means which is operable to vary the firing time of the rectifiers relative to the energization of the windings. This varies the effective value of the capacitors and changes the speed of the stepping motor.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
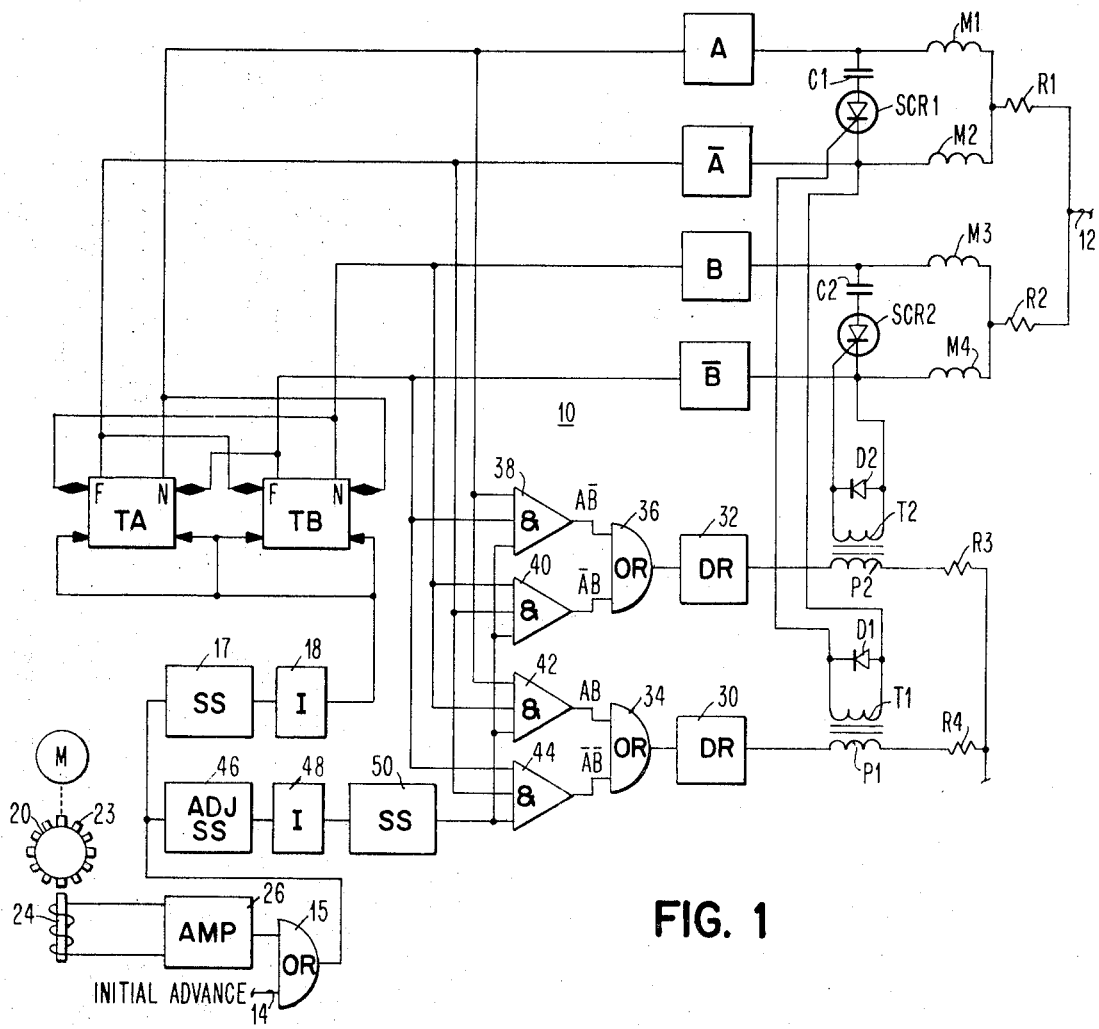
FIG. 1 is a schematic circuit diagram of a stepping motor control system embodying the invention in one of its forms.

Referring particularly to FIG. 1 of the drawings, the reference numeral 10 denotes generally a control circuit for a stepping motor M having phase windings M1, M2, M3 and M4, respectively. The motor M may be generally of the type described in Paper 61–650 recommended by the AIEE Industrial Control Committee and presented at the AIEE North Eastern District Meeting, Hartford, Connecticut, May 17–19, 1961, by Arthur E. Snowdon and Elmer W. Madsen, entitled "Characteristics of a Synchronous Inductor Motor," and in particular, of the bifilar type shown in FIG. 10 of said paper. The windings M1 and M2 are connected together at one end, and are connected by means of a resistor R1 to one terminal 12 of a suitable source of electrical energy. The windings M3 and M4 are similarly connected at one end by a resistor R2 to the same terminal of the source. The other ends of the windings are connected by means of drivers A, $\overline{A}$, B and $\overline{B}$ to the terminals of a pulse source, such as for example, a pair of triggers TA and TB which are connected to sequentially energize the windings M1 through M4 in a well-known stepping manner. The triggers TA and TB are driven either by pulses from a separate pulse source such as an oscillator or the like, or by pulses from an OR circuit 15, to which an Initial Advance pulse may be applied over conductor 14 for starting the motor, and to which pulses are thereafter supplied from an emitter 20 comprising a toothed magnetic rotor driven by the motor M and having a plurality of teeth 22 about the periphery which induce pulses in a magnetic read head 24 as they pass thereby. The read head is connected to the OR circuit 15 by means of a suitable amplifier 26. The output of the OR 15 is connected to the triggers TA and TB through a single shot 17 and inverter 18 so as to advance the triggers on the trailing edge of each pulse from the single shot 17 and produce a nominal retard in the operation of the triggers for control purposes.

In accordance with the invention, commutating capacitors C1 and C2, which assist in the commutating or switching of the motor windings, and are normally connected directly across the pairs of windings M1, M2, and M3, M4, respectively, to remove switching spikes and improve the torque of the motor by initially storing and later effecting a transfer of electrical energy from one winding to the other during the switching off of the one winding and the switching on of the other of the pair by the respective triggers, are instead connected across their respective pairs of windings M1, M2 and M3, M4 through control means such as the silicon controlled rectifiers SCR1 and SCR2, respectively, so that the time of their connection across the pairs of windings may be varied relative to the time of energization of the respective windings. The SCRs are activated by means of pulse transformers T1 and T2, the secondary windings of which are connected to the control electrodes of their respective rectifiers. Diodes D1 and D2 connected across the secondary windings provide uni-directional pulsing of the rectifiers. The primary windings P1 and P2 of the pulse transformers are connected at one end of a suitable source of electrical energy through resistors R3 and R4, respectively. The other ends of the primary windings are connected by means of drivers 30 and 32 to OR circuits 34 and 36, respectively. These OR circuits are activated by AND gating circuits 38, 40, 42 and 44. AND 38 is gated by the on output of trigger TA and the off output of trigger TB; and 40 is gated by the on output of trigger TB and the off output of trigger TA; AND 42 is gated by the on output of trigger TA and the on output of trigger TB; AND 44 is gated by the off output of trigger TB and the off output of trigger TA. The pulse time of the transformers T1 and T2 is controlled by using an adjustable single shot 46 having a variable pulse width for controlling the timing of the application of pulses from the OR circuit 15 to the AND circuits 38 through 44 through inverter 48 and single shot 50.

Figure 2:
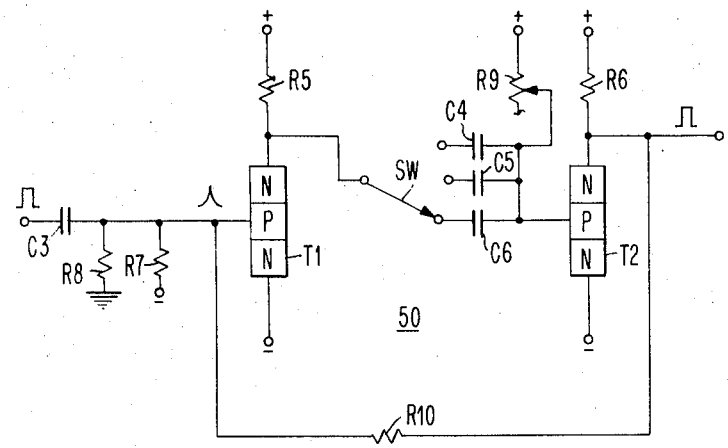
FIG. 2 is a schematic circuit diagram of an adjustable single shot which may be used in the circuit of FIG. 1.

Referring to FIG. 2, it will be seen that the single shot 46 may comprise a pair of transistors T1 and T2, transistor T2 being biased on by having its base connected to the positive terminal of a suitable source of electrical energy through an adjustable bias resistor R9, while the collector is connected to the same source through a collector resistor R6. The transistor T1 is normally biased off by having its collector connected through a collector resistor R5 to the positive terminal of the source, and having its base connected between the negative terminal of the source and ground through a voltage divider comprising resistors R7 and R8 so as to bias the base negative relative to the emitter. A coupling capacitor C3 provides for applying a peaked positive pulse to the base of the transistor T1 in response to the application of a positive pulse to the capacitor C3. The base of the transistor T2 is connected by means of a switch SW and a plurality of capacitors C4, C5, and C6 of different values to the collector of the transistor T1 to provide for varying the turn off time of T2. A feedback connection is provided through a resistor R10 from the collector of transistor T2 to the base of transistor T1.

In operation, the transistor T1 is normally biased off and the transistor T2 is normally biased on. When a positive pulse is applied to the capacitor C3, a positive spike applied to the base of the transistor T1 turns it on and drops the collector voltage. This permits capacitor C6, which is shown connected by switch SW between the base of T2 and the collector of T1, to start charging and drops the base of transistor T2 to sufficiently turn it off. When transistor T2 turns off, its collector voltage rises and the feedback resistor R10 applies a positive voltage to the base of the transistor T1 to keep it turned on. As soon as the capacitor C6 charges, the base of the transistor T2 returns to its positive value and the transistor turns on, dropping the collector voltage to terminate the output pulse. Dropping of the collector voltage of the transistor T2 drops the base voltage of the transistor T1 and turns it off, returning the circuit to the original condition.

Figure 3:
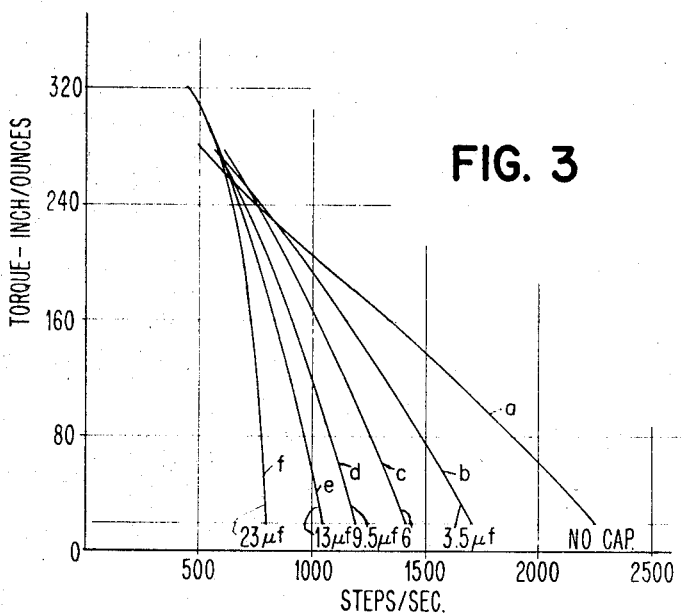
FIG. 3 shows a plurality of curves representing the speed-torque relations of a stepping motor using different values of commutating capacitors.
Figure 4:
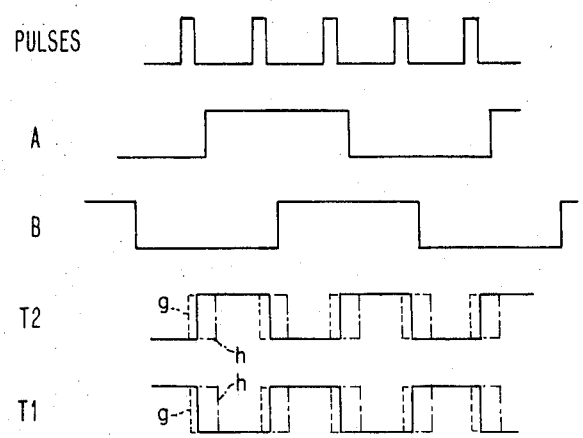
FIG. 4 shows a set of timing curves showing the relative timing of the pulse transformers and the triggers for different operating conditions.

In operation, the motro M will be started by means of an Initial Advance pulse applied to conductor 14 which turns on the single shot 17 causing a pulse to be applied to the triggers TA and TB so as to cause them to step one step. Whichever trigger is initially on will be turned off and the other one will be turned on, thus selectively energizing the windings M1 through M4 through the drivers A, B, $\bar{A}$, $\bar{B}$ in sequence. As the triggers TA and TB are switched on and off in sequence, as shown in FIG. 4, the AND circuits 38 through 44 are selectively activated to energize their respective drivers 30 and 32 in timed relation with the operation of the triggers TA and TB and fire SCR1 and SCR2 through the pulse transformers T1 and T2, respectively. By adjusting adjustable resistor R9, or changing the position of the switch SW and inserting different values of capacitance in the circuit of the single shot 50, the duration of the output pulse from the singleshot 46 may be changed and the relative timing of the pulses from output transformers T1 and T2 relative to the occurrence of the output pulses from the triggers TA and TB may be changed. This changes the switching time of the commutating capacitors C1 and C2 relative to the output pulses from the triggers TA and TB and changes their charging time and the effective value of the capacitors. Referring to FIG. 3, it will be seen as shown by the family of curves $a-f$ for different values of capacitance ranging from zero to 23 microfarads for the capacitors C1 and C2, that a control system may be provided for a stepping motor for varying the speed thereof. By controlling the switching time of the capacitors, their effective value may be changed from the full rated value to a substantially zero value, and the speed of the motor may be varied over a relatively wide stepping rate.

As shown in FIG. 4, the single shot 17 and inverter 18 causes the triggers TA and TB to be switched on the trailing edges of the emitter pulses. When the adjustable single shot 46 is adjusted for minimum delay, the pulse transformers may be fired slightly ahead of the triggers, by selecting a value of capacitor C6 to give a pulse of less duration than single shot 17 so as to utilize the maximum effect of the commutating capacitors, such as represented by the dotted curves $(g)$ for the pulse transformers T1 and T2. The output pulses of T1 and T2 are shown as exaggerated in time in order to show the effects of the variable single shot in changing the timing. Actually, they would be of relatively short duration as comparted with the emitter pulses, on the order of 5-10 microseconds for example.

By selecting a larger value of capacitor C4, or increasing the effective value of resistor R9, the single shot 46 may be given a longer pulse time so as to fire the pulse transformers T1 and T2 at a later time, such as represented by the dash curves $(h)$, thus reducing the charge time of the commutating capacitors and reducing their effective values, to increase the effective stepping speed. By way of example, the single shot 17 may have a pulse duration on the order of 10 microseconds. The adjustable single shot 46 can have a range on the order of 0-100 microseconds, and the fixed single shot 50 which determines the duration of the pulses for firing the pulse transformers T1 and T2 can have a duration on the order of 20 microseconds.

While the invention ras been particularly shown and described with reference to a preferred embodiment thereof, it will be understood by those skilled in the art that various changes in form and details may be made therein without departing from the spirit and scope of the invention.

What is claimed is:

1. In a control system for a stepping motor having a plurality of separate phase windings connected in pairs with one end of each winding connected to be sequentially connected to one terminal of a source of electrical energy by pulse generating means and the other ends connected in a common return to the other terminal of the source for sequentially operating the motor in incremental steps, a capacitor connected between the pulse generating means ends of each pair of said windings, switch means connected in series circuit relation with each capacitor and its associated pair of windings, and control means connected to the switch means and the pulse generating means to operate the switch means in different time relations with the pulse generating means to vary the effective value of the capacitors.

2. The invention as defined in claim 1 characterized by the pulse generating means comprising a pair of triggers connected in a self-gating ring for operation in response to a succession of motor advance control pulses.

3. The invention as defined in claim 2 characterized by the switch means comprising bi-directional silicon controller rectifiers.

4. The invention as defined in claim 3 characterized by the control circuit including pulse transforming connected to control the silicon controlled rectifiers and gated by the pulse generating means triggers.

5. The invention as defined in claim 4 characterized by the control circuit including adjustable delay means connected to apply the motor advance pulses to the pulse transformers in a variable delayed time relation.

6. The invention as defined in claim 5 characterized by the adjustable delay means comprising a cascade connection of an adjustable single shot, an inverter and a fixed single shot.

7. The invention as defined in claim 6 characterized by fixed delay means connected to apply the motor advance signal to the pulse generating triggers.

8. The invention as defined in claim 7 characterized by the pulse transformers being connected to a source of electrical energy by logic selection circuit means including AND circuits connected to each of the pulse generating triggers and to the adjustable delay means.

References Cited
UNITED STATES PATENTS

| 3,392,318 | 7/1968 | Huntzinger | 318—138X |
| 3,414,800 | 12/1968 | Sheldrake et al. | 318—138X |
| 3,444,447 | 5/1969 | Newell | 318—138 |

GLEN SIMMONS, Primary Examiner

U.S. Cl. X.R.

318—18